United States Patent
Kennedy et al.

(10) Patent No.: US 8,500,407 B1
(45) Date of Patent: Aug. 6, 2013

(54) COMPOSITE BLADE ROOT-END DRILL-THROUGH LUG AND ATTACHMENT METHOD

(75) Inventors: Dennis K. Kennedy, Mesa, AZ (US); Zach K. Stahlecker, Chandler, AZ (US); Jonathan D. Roesch, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 603 days.

(21) Appl. No.: 12/748,414

(22) Filed: Mar. 28, 2010

(51) Int. Cl.
*B64C 27/48* (2006.01)

(52) U.S. Cl.
USPC ........................................ 416/210 R; 416/209

(58) Field of Classification Search
USPC ................... 403/150, 151, 154; 416/205, 206, 416/207, 209, 201 A, 210 R, 210 A, 239
See application file for complete search history.

(56) References Cited

U.S. PATENT DOCUMENTS

| | | | |
|---|---|---|---|
| 3,713,753 A | 1/1973 | Brunsch | |
| 3,765,267 A * | 10/1973 | Bourquardez et al. | 74/581 |
| 4,110,056 A * | 8/1978 | Stevenson | 416/230 |
| 4,545,837 A | 10/1985 | Wehnert et al. | |
| 4,652,210 A * | 3/1987 | Leman et al. | 416/140 |
| 4,892,462 A * | 1/1990 | Barbier et al. | 416/226 |
| 5,074,753 A | 12/1991 | Covington et al. | |
| 5,222,297 A | 6/1993 | Graff et al. | |
| 5,474,424 A * | 12/1995 | Bietenhader et al. | 416/134 A |
| 6,074,126 A | 6/2000 | Hunter et al. | |
| 6,102,610 A * | 8/2000 | Palusis et al. | 403/388 |
| 7,047,596 B2 * | 5/2006 | Sucic et al. | 16/2.1 |
| 7,165,945 B2 | 1/2007 | Kovalsky et al. | |
| 8,122,586 B2 * | 2/2012 | Muylaert et al. | 29/592 |
| 2005/0262682 A1 * | 12/2005 | Grover et al. | 29/428 |
| 2009/0085351 A1 * | 4/2009 | Cloos et al. | 285/368 |

FOREIGN PATENT DOCUMENTS

WO  WO 2008/087443 A1  7/2008

* cited by examiner

*Primary Examiner* — Edward Look
*Assistant Examiner* — Liam McDowell
(74) *Attorney, Agent, or Firm* — Ameh IP; Elahe Toosi; Lowell Campbell

(57) ABSTRACT

A method for reducing bearing stress in a composite structure is disclosed. A composite structure comprises at least one coupling hole for coupling to the composite structure, and at least one bushing structure is coupled to the at least one coupling hole. A metal bushing retainer structure is coupled to the at least one bushing structure and the composite structure.

20 Claims, 9 Drawing Sheets

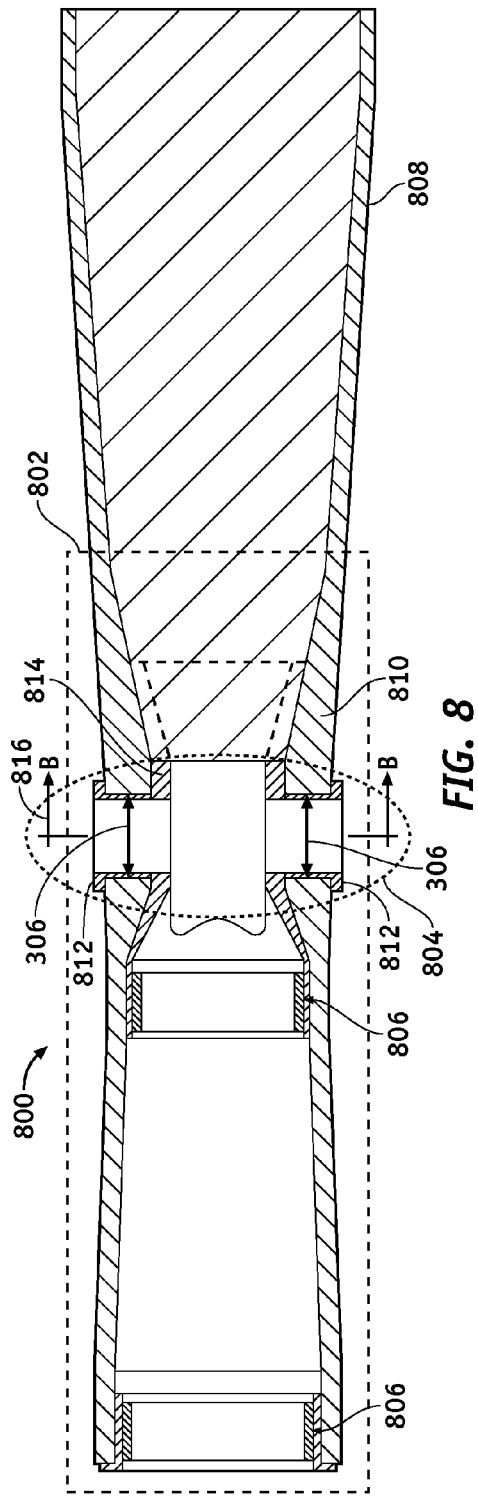
FIG. 8
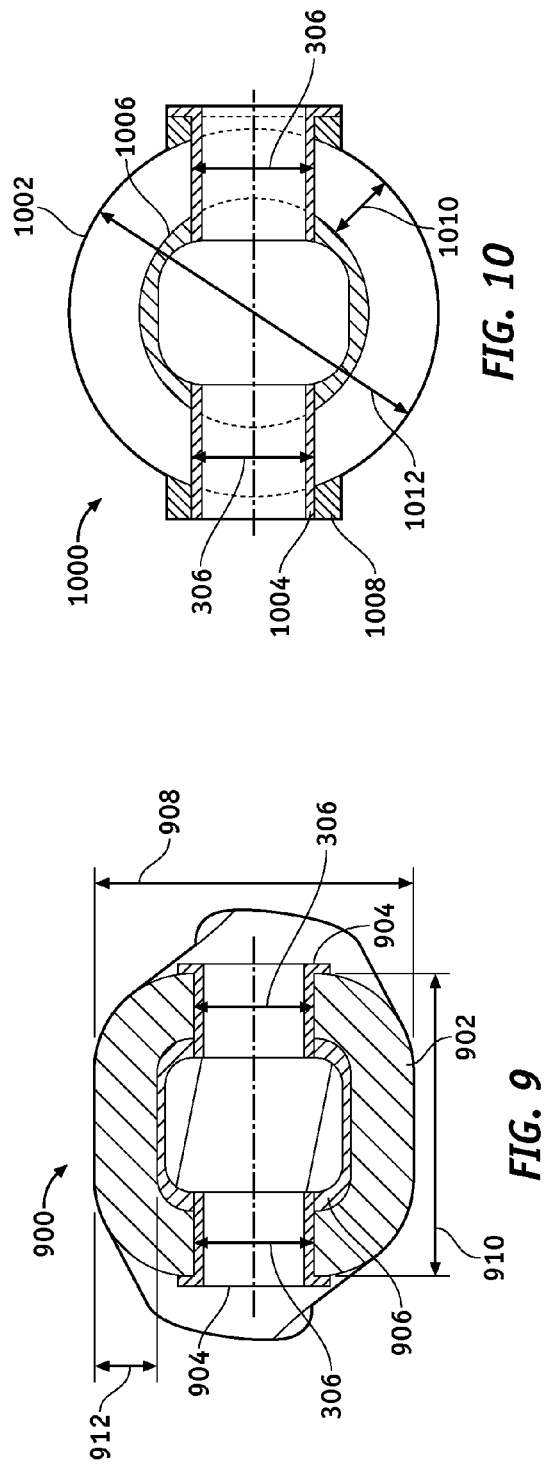
FIG. 10
FIG. 9

COMPOSITE BLADE ROOT-END DRILL-THROUGH LUG AND ATTACHMENT METHOD

GOVERNMENT RIGHTS

This invention was made with Government support under contract number, Phase II: W58RGZ-05-C-0410 with continuing development under current Phase III: W58RGZ-05-G-0005/0086 awarded by the U.S. Army. The government has certain rights in this invention.

FIELD

Embodiments of the present disclosure relate generally to material coupling. More particularly, embodiments of the present disclosure relate to reducing bearing stresses in composite materials.

BACKGROUND

In order to reduce weight and increase structural strength, aircraft designs increasingly utilize composite materials. While composite materials are generally strong under tensile, compression and bending loads, composite materials may have limited strength under bearing stresses. For example, helicopter blades attached to a rotor hub may experience bearing stresses at attachment points such as an attachment point of a helicopter blade to a rotor-hub strap pack.

Thus, there is a need for designs and methods for coupling objects made from composite materials to other objects while reducing bearing stresses.

SUMMARY

A method for reducing bearing stress in a composite structure is disclosed. The composite structure comprises at least one coupling hole for coupling the composite structure. A metal bushing retainer structure is coupled to the at least one coupling hole to absorb bearing stress and protect the at least one coupling hole from bearing stress. The metal bushing retainer structure allows the composite structure to be made substantially from composite material while being robust to coupling hole bearing stress.

In a first embodiment, an aircraft system comprises a rotor hub and a composite blade. The rotor hub comprises a blade connector, and the composite blade comprises a hub connector. The hub connector comprises a fastener assembly hole, a bushing coupled to the fastener assembly hole, and an inner metal bushing retainer coupled to the bushing and the fastener assembly hole. A fastener assembly couples the blade connector and the hub connector through the fastener assembly hole.

In a second embodiment, an apparatus reinforces a joint in a composite material. A composite structure comprises a fastener assembly hole, and a bushing structure is coupled to the composite structure. A first metal bushing retainer structure is coupled to the bushing structure and the composite structure.

In a third embodiment, a method reduces bearing stress in a composite structure. A composite structure comprising at least one coupling hole is provided. At least one bushing structure coupled to the at least one coupling hole is also provided. The method also provides a metal bushing retainer structure coupled to the at least one bushing structure and the composite structure.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 8 is an illustration of a cross sectional view of an exemplary rotor blade-to-hub coupling structure according to an embodiment of the disclosure.

FIG. 9 is an illustration of a cross sectional view taken along line B-B of the exemplary rotor blade-to-hub coupling structure of FIG. 8 according to an embodiment of the disclosure.

FIG. 10 is an illustration of a cross sectional view taken along line B-B of the exemplary rotor blade-to-hub coupling structure of FIG. 8 showing a separate external bushing retainer and an alternate geometry according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft control systems, drilling and fastening techniques, high lift devices, blade design and assembly, composite manufacturing techniques such as prepreg and lamination, and other functional aspects of the systems (and the individual operating components of the systems) may not be described in detail herein. In addition, those skilled in the art will appreciate that embodiments of the present disclosure may be practiced in conjunction with a variety of different aircraft control systems, blade and hub configurations, and that the system described herein is merely one example embodiment of the disclosure.

Embodiments of the disclosure are described herein in the context of practical non-limiting applications, namely, helicopter blades. Embodiments of the disclosure, however, are not limited to such helicopter blade applications, and the techniques described herein may also be utilized in other composite material applications. For example, embodiments may be applicable to windmills, sports equipments, boats, automotive parts, marine applications, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Figure 1:
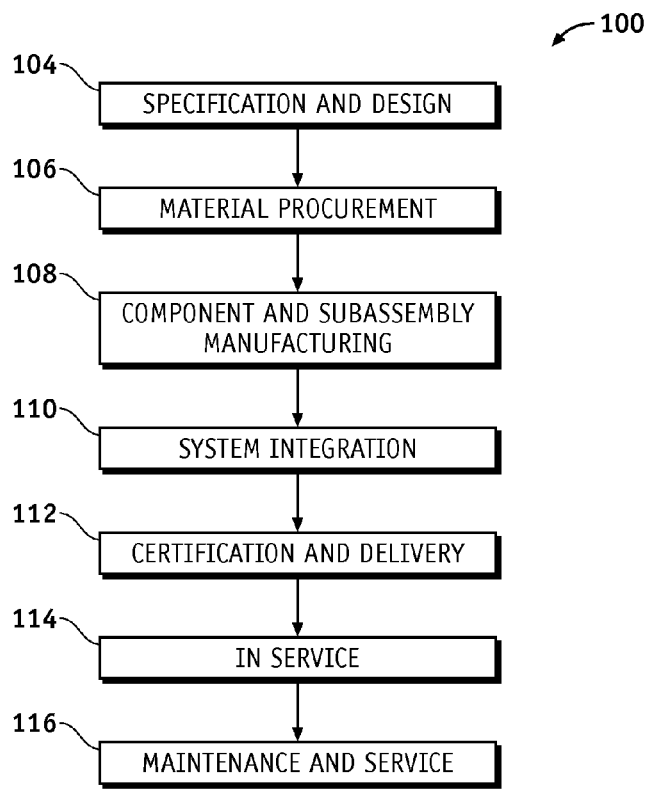
FIG. 1 is an illustration of a flow diagram of an exemplary aircraft production and service methodology.
Figure 2:
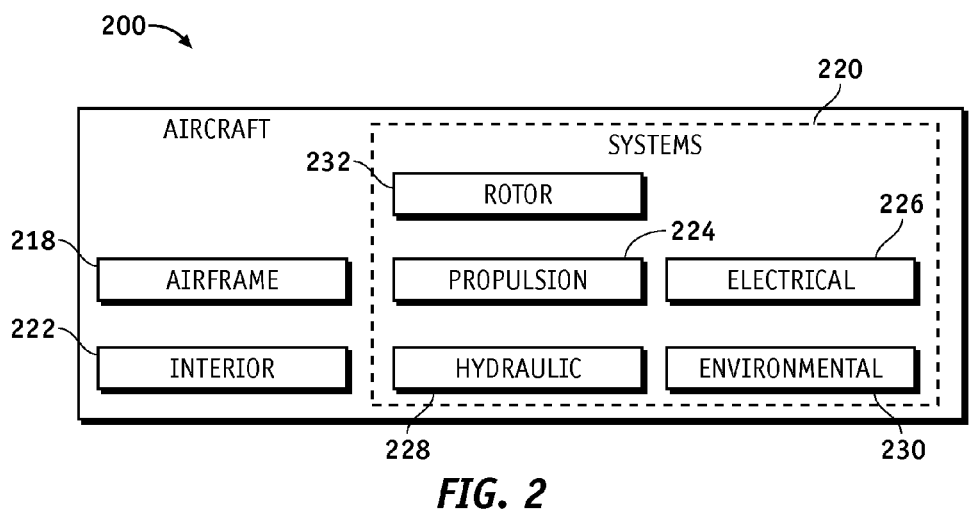
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, an environmental system 230, and a rotor system 232. Any number of other systems may also be included. Although an aerospace example is shown, the embodiments of the disclosure may be applied to other industries, such as the automotive, windmills, sports equipments, boats, marine applications, and the like.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
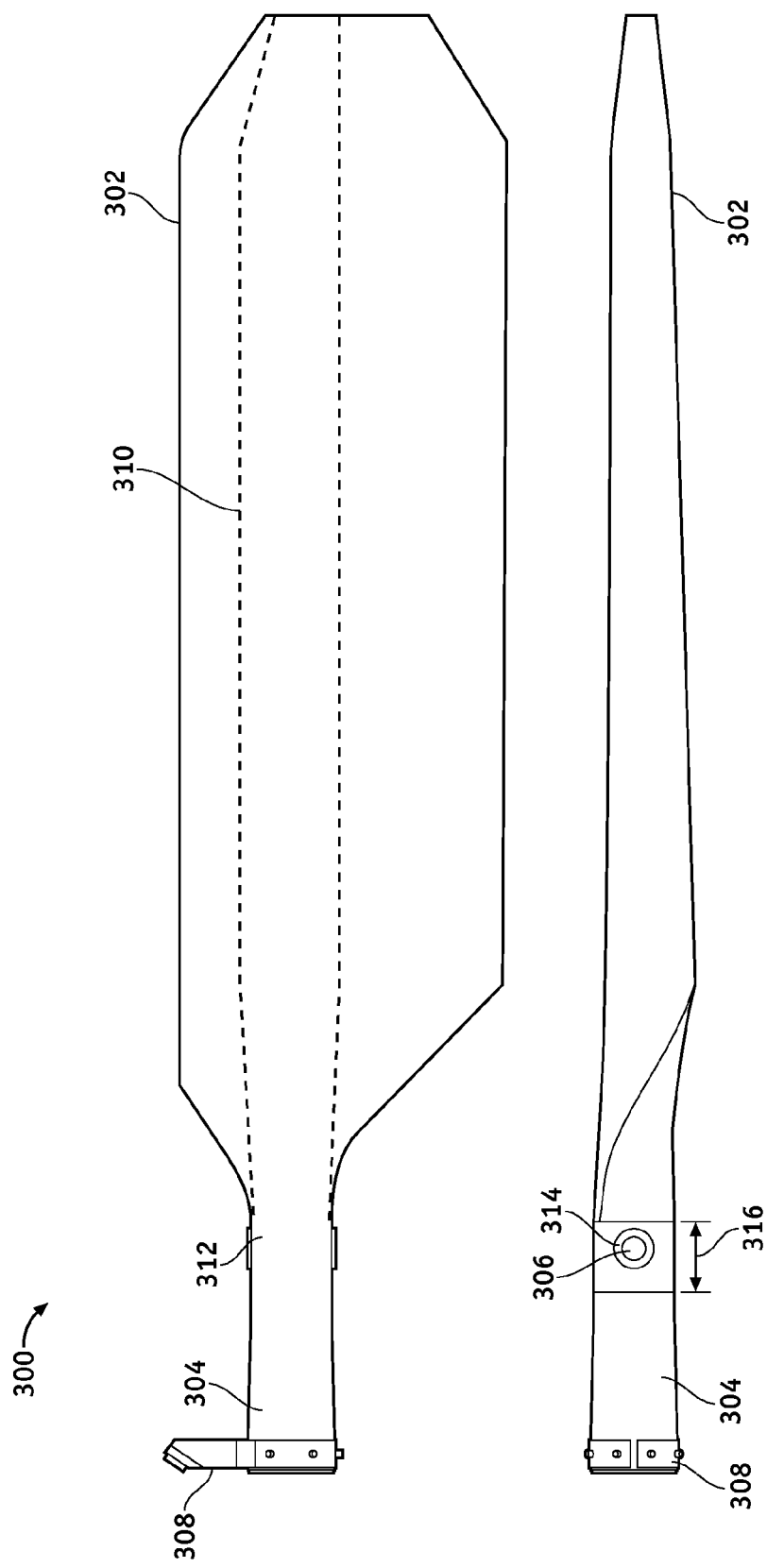
FIG. 3 is an illustration of a top perspective and a side perspective view of an exemplary helicopter blade comprising a composite integrated root end cuff.

FIG. 3 is an illustration of a top and a side view of an exemplary composite blade 300 comprising a composite integrated root end cuff 304 according to an embodiment of the disclosure. The exemplary composite blade 300 comprises a composite airfoil 302, the composite integrated root end cuff 304, a fastener assembly hole 306, and a pitch control device 308.

The composite airfoil 302 may comprise a composite blade spar 310 continuously coupled to the composite integrated root end cuff 304. The composite airfoil 302 is weight efficient, less susceptible to fatigue, and has a lower and more uniform stiffness than a metal airfoil, which reduces stress concentration that may occur in a metal airfoil.

Figure 4:
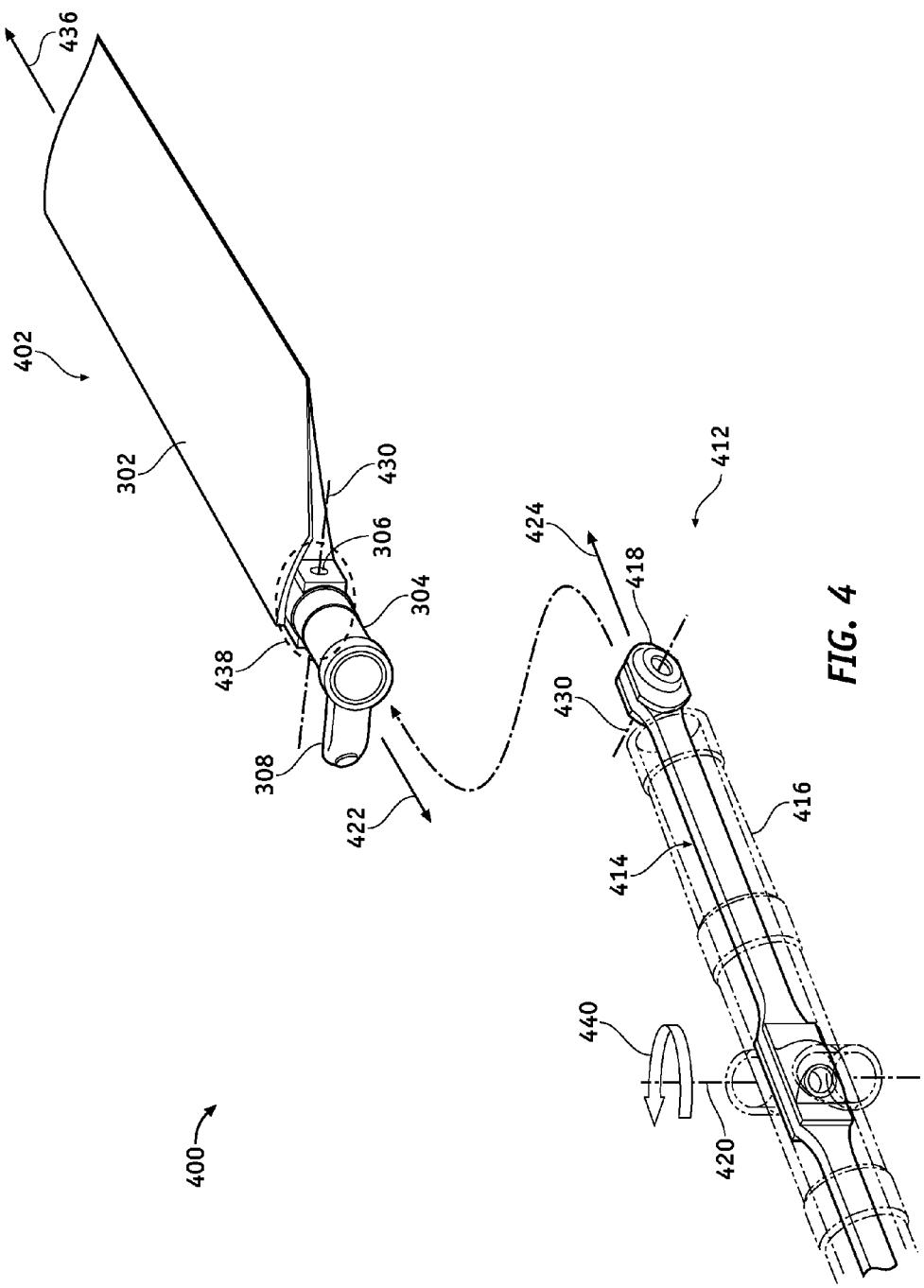
FIG. 4 is an illustration of an exemplary helicopter blade system comprising a helicopter blade and a rotor hub according to an embodiment of the disclosure.

The composite blade spar 310 provides structural support to the composite airfoil 302 and the composite integrated root end cuff 304 of the composite blade spar 310, and provides a coupling mechanism to a rotor hub (412 in FIG. 4).

The fastener assembly hole 306 may be created by drilling through the thickened section 312 in the composite blade spar 310, and may be re-enforced with metallic cold work expansion bushings 314 as explained in more detail in the context of discussion of FIG. 5 below. Width 316 of the thickened section 312 may vary depending on design requirements. The width 316 of the thickened section may be, for example but without limitation, about 2 inches to about 18 inches, or the like.

Composite laminate may be thickened locally at the fastener assembly hole 306, by, for example but without limitation, inclusion of additional plies into the composite laminate, and the like. If the composite laminate is constructed using braiding manufacturing technology, then a fastener region such as the thickened section 312 near the fastener assembly hole 306 may be thickened. The thickening may be accomplished by, for example but without limitation: a) inclusion of additional dry fabric forms between successive braided layers of the composite laminate; b) varying a ply angle within each braided layer of the composite laminate; and by a combination of (a) and (b), or the like.

A drill-through approach provides for a continuous composite structure eliminating structural bonding and mechanical joints between distinct separate functioning blade sections such as the composite integrated root end cuff 304 to the composite blade spar 310. The drill-through composite solution performs load carrying functions, while achieving a lower section stiffness, reduced weight, machining and assembly cost goals. Fatigue life benefits of composite materials are realized throughout the composite blade 300 by providing a continuous unitary composite structure that eliminates the mechanical or structural bonding of two otherwise distinct sections to complete a blade assembly, where one section is made of metal. Weight can be reduced by replacing a metallic root fitting component with a continuous composite section, since composites offer a significantly lower density and a high strength to weight ratio. The drill-through approach provides a structurally efficient coupling mechanism for coupling the composite blade 300 to a rotor hub (412 in FIG. 4) at the composite integrated root end cuff 304 as explained in more detail in the context of discussion of FIG. 4 below.

The pitch control device 308 may be coupled to a pitch linkage assembly (not shown) to provide a pitch control mechanism for the composite airfoil 302.

FIG. 4 is an illustration of an exemplary helicopter blade system 400 comprising a helicopter composite rotor blade 402 comprising a hub connector 438 and a rotor hub 412 comprising a blade connector 418. The helicopter composite rotor blade 402 comprises the composite airfoil 302, the composite integrated root end cuff 304, the fastener assembly hole 306 coupled to a fastener assembly 430 in the hub connector 438, and the pitch control device 308. The exemplary helicopter blade system 400 has a structure similar the exemplary composite blade 300; therefore, common features, functions, and elements may not be redundantly described here. The fastener assembly 430 couples the blade connector 418 to the hub connector 438 through the fastener assembly hole 306 as explained in more detail below. The hub connector 438 is suitably assembled to reduce composite bearing stresses in the fastener assembly hole 306 as explained in more detail below.

The rotor hub 412 comprises a hub strap pack 414, a hub section 416, and the blade connector 418. The rotor hub 412 is coupled to the helicopter composite rotor blade 402 via the blade connector 418. The rotor hub 412 rotates about axes 420 and rotates the helicopter composite rotor blade 402 along therewith to generate thrust. In operation, the helicopter composite rotor blade 402 generates a centrifugal force 436 as it rotates which causes a root end cuff reaction force 422 and thereby a hub reaction force 424. The hub reaction force 424 may be, for example but without limitation, about 10,000 lbs to about 150,000 lbs, and the like. The hub reaction force 424 may cause composite bearing stresses in the fastener assembly hole 306. Embodiments of the disclosure reduce or redistribute these composite bearing stresses as explained in more detail below. Arrow 440 indicates a direction of rotation of the helicopter composite rotor blade 402 about the axis 420.

The hub strap pack 414 absorbs the hub reaction force 424 due to action of the centrifugal force 436 from the helicopter composite rotor blade 402.

The hub section 416 provides a reaction for chord-wise and flap-wise bending moments, supports the hub strap pack 414, and fits into the composite integrated root end cuff 304.

Figure 5:
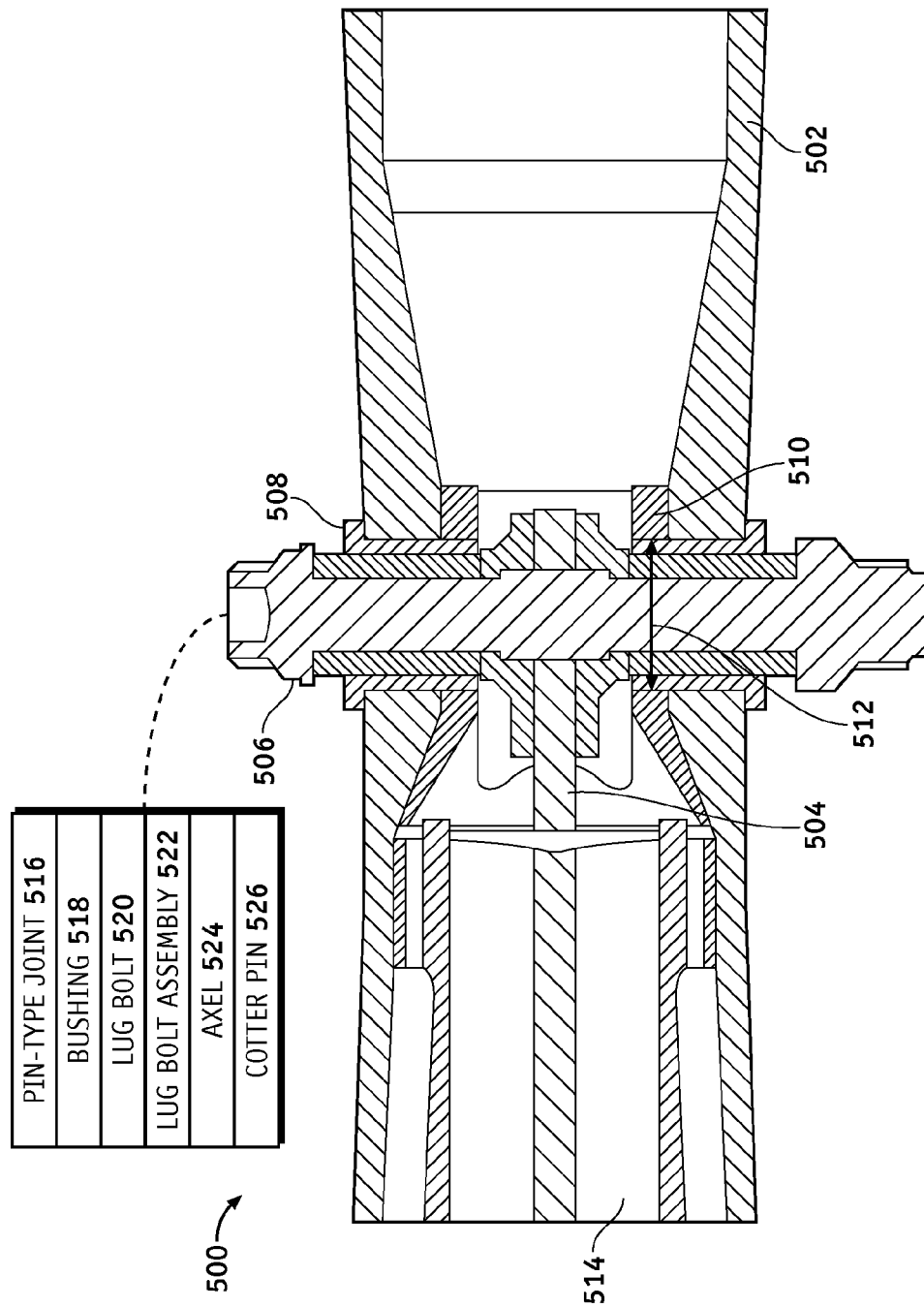
FIG. 5 is an illustration of a cross sectional view of an exemplary rotor blade-to-hub coupling structure of a hub strap pack to a helicopter blade comprising according to an embodiment of the disclosure.

The blade connector 418 couples the helicopter composite rotor blade 402 to the rotor hub 412 by coupling the blade connector 418 to the fastener assembly hole 306 via a fastener assembly (506 in FIG. 5). In this manner, the centrifugal force 436 caused by rotation of the helicopter composite rotor blade 402 is transferred from the composite integrated root end cuff 304 to the rotor hub 412. The blade connector 418 is fitted to align with the fastener assembly hole 306.

FIG. 5 is an illustration of a cross sectional view of an exemplary rotor blade-to-hub coupling structure 500 (hub connector 500 similar to hub connector 438 in FIG. 4) of a strap pack 504 to the helicopter composite rotor blade 402 (FIG. 4) according to an embodiment of the disclosure. The exemplary rotor blade-to-hub coupling structure 500 comprises a composite integrated root end cuff 502, the strap pack 504, a fastener assembly 506, a cold worked bushing 508, an inner metal bushing retainer 510, and a fastener assembly hole 512. The cold worked bushing 508 is coupled to the fastener assembly hole 512, and the inner metal bushing retainer 510 is coupled to the cold worked bushing 508 and the fastener assembly hole 512. In this manner, the bearing stresses in the fastener assembly hole 512/306 are reduced as explained in more detail below.

The composite integrated root end cuff 502 (composite structure; 304 in FIGS. 3-4) comprises an integrated composite structure comprising the fastener assembly hole 512.

The strap pack 504 is operable to absorb the hub reaction force 424 (FIG. 4) due to action of the centrifugal force 436 from the helicopter composite rotor blade 402 via the composite integrated root end cuff 502. A hub section 514 may cover the strap pack 504.

The fastener assembly 506 fits through the fastener assembly hole 512 to couple the composite integrated root end cuff 502 to the strap pack 504. The fastener assembly 506 may be, for example but without limitation, a preload clamping bushing as shown in FIG. 5, a pin-type joint 516, a bushing 518, a lug bolt 520, a lug bolt assembly 522, an axle 524, a cotter pin 526, and the like.

The cold worked bushing 508 (bushing structure) is installed in the fastener assembly hole 512 between the composite integrated root end cuff 502 and the fastener assembly 506, and may be coupled to the composite integrated root end cuff 502. The cold worked bushing 508 is coupled or attached to the metal bushing retainer 510 to reinforce the composite integrated root end cuff 502 against bearing stresses. For example but without limitation, the cold worked bushing 508 may be attached to the metal bushing retainer 510 via cold working, diffusion bonding, super plastic diffusion bonding, welding, soldering, and the like. The cold worked bushing 508 provides good uniform load transfer of bearing stress, thereby protecting the composite integrated root end cuff 502 from bearing stresses caused by forces from interaction of the composite integrated root end cuff 502 with the fastener assembly 506. The embodiment in FIG. 5 shows paired bushings as an example of the cold worked bushing 508, however other bushing configurations, such as but without limitation, a single bushing through a flat surface, multiple bushings through multiple holes in a surface, and the like, may also be used. The cold worked bushing 508 may comprise, for example but without limitation, metallic cold work expansion bushings, and the like.

The inner metal bushing retainer 510 (metal bushing retainer) reinforces and protects the composite integrated root end cuff 502 from bearing stresses that may be caused by forces from interaction of the composite integrated root end cuff 502 with the fastener assembly 506. These forces may be caused by, for example, the hub reaction force 424 within the fastener assembly 506 due to the centrifugal force 436. The inner metal bushing retainer 510 may be configured to incorporate and perform other functions, such as providing pitch bearing and flap and chord load reaction point support. The inner metal bushing retainer 510 may be coupled or attached to the composite integrated root end cuff 502 via, for example but without limitation, adhesive bonding, co-curing, gluing, and the like.

The above description and the description below refer to elements or nodes or features being "attached" together. As used herein, unless expressly stated otherwise, "attached" means that one element/node/feature is directly mechanically joined or fused to another element/node/feature. For example, an element may be attached to another element by, for example but without limitation, cold working, diffusion bonding, super plastic diffusion bonding, welding, soldering, riveting, co-curing, pressure forming, adhesive bonding, gluing, and the like.

Figure 6:
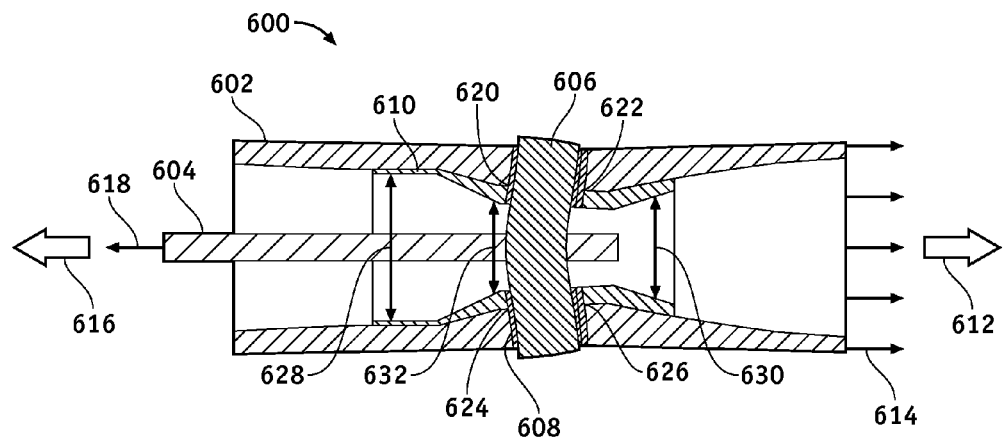
FIG. 6 is an illustration of a cross sectional view of an exemplary rotor blade-to-hub coupling structure showing deflection on a composite integrated root end cuff and inner metal bushing retainer according to an embodiment of the disclosure.

FIG. 6 is an illustration of a cross sectional view of an exemplary rotor blade-to-hub coupling structure 600 showing deflection on a composite integrated root end cuff 602 and an inner metal bushing retainer 610 according to an embodiment of the disclosure. The exemplary rotor blade-to-hub coupling structure 600 comprises the composite integrated root end cuff 602, a strap pack 604, a fastener assembly 606, a cold worked bushing 608, and the inner metal bushing retainer 610.

The composite integrated root end cuff 602 is pulled by centrifugal force 612 (436 in FIG. 4) from the helicopter composite rotor blade 402 (FIG. 4) when rotating in an outward direction 614 away from the rotor hub 412 (FIG. 4).

The strap pack 604 is stretched by the centrifugal force 612 from the composite integrated root end cuff 602 away from the rotor hub 412, and by a centripetal force 616 from the rotor hub 412 in an inward direction 618 toward the rotor hub 412.

The fastener assembly 606 (506 in FIG. 5) couples the composite integrated root end cuff 602 to the strap pack 604, and may be stressed by their opposing centrifugal force 612 and the centripetal force 616.

The cold worked bushing 608 (314 in FIGS. 3 and 508 in FIG. 5) protects the composite integrated root end cuff 602 from bearing stresses at edges 620/622/624/626.

The inner metal bushing retainer 610 may be coupled or attached to the cold worked bushing 608. Peak contact stress in the composite integrated root end cuff 602 is reduced due to loads such as the centrifugal force 612 being redirected by the inner metal bushing retainer 610, thereby protecting the composite integrated root end cuff 602 from bearing stresses at the edges 620/622/624/626 as explained below.

Figure 7:
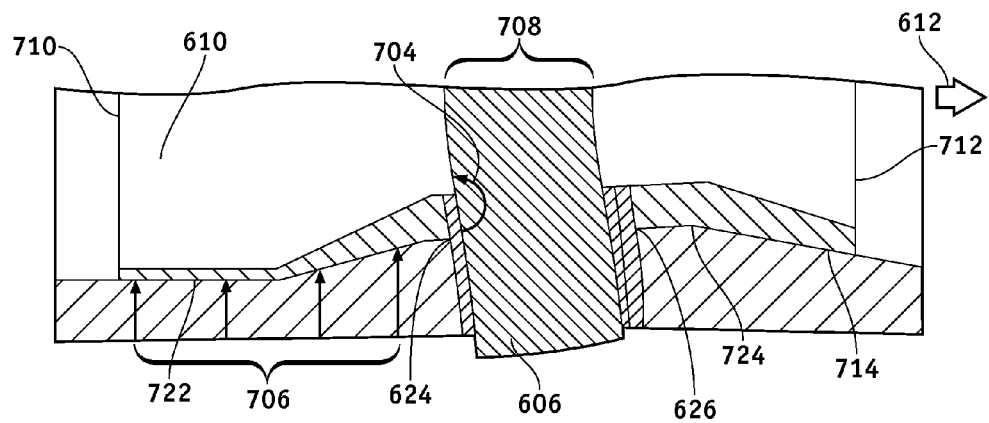
FIG. 7 is an illustration of an expanded view of the cross sectional view of the exemplary rotor blade-to-hub coupling structure 600 shown in FIG. 6 according to an embodiment of the disclosure.

FIG. 7 is an illustration of an expanded view of the cross sectional view of the exemplary rotor blade-to-hub coupling structure 600 according to an embodiment of the disclosure. The inner metal bushing retainer 610 dissipates bearing stresses at edges 624/626 from the fastener assembly 606 into an interface or contact area 722/724 of the inner metal bushing retainer 610 with the composite integrated root end cuff 602 to protect the edges 626/624. For example, a moment 704 created by bending in the fastener assembly 606 is partially reacted by the inner metal bushing retainer 610. The moment 704 is reacted by distributed load 706 of a large contact area such as the contact area 722, thereby reducing bearing stress at edge 624. In addition, the inner metal bushing retainer 610 reinforces the composite integrated root end cuff 602. The inner metal bushing retainer 610 may be made in any shape suitable to protect the composite integrated root end cuff 602 from bearing stresses at the edges 620/622/624/626. The inner metal bushing retainer 610 may, for example and without limitation, flare laterally outwardly from a conic taper section 632 at or near an inner section 708 to increased cross sections 628/630 at its both ends 710/712 respectively with a generally, for example but without limitation, a parabolic external profile, and the like. Cross sectional dimensions of the conic taper section 632, the cross section 628, and the cross section 630 may be, for example but without limitation, about 1.5 inches to about 2.25 inches, about 1.6 inches to about 2.5 inches, about 1.2 inches to about 2.0 inches respectively, and the like.

In one embodiment, a tapered outer section 714 may be used to provide a means for load sharing between the inner metal bushing retainer 610 and the composite integrated root end cuff 602. Without the tapered outer section 714, the centripetal force 616 may be transferred directly to the fastener assembly 606 causing additional bearing stresses on the edges 620/622/624/626 due to bending of the fastener assembly 606. The inner metal bushing retainer 610 may be made of any metal such as but without limitation, titanium, steel, aluminum, and the like, depending, for example but without limitation, on a type of the composite used for making the composite integrated root end cuff 602 and the composite blade spar 310, and the like.

FIG. 8 is an illustration of a cross sectional view of an exemplary rotor blade-to-hub coupling structure 800 according to an embodiment of the disclosure. The exemplary rotor blade-to-hub coupling structure 800 comprises a composite integrated root end cuff 802, and a composite bushing section 804. Embodiments shown in FIG. 8 may have functions, material, and structures that are similar to the embodiments shown in FIGS. 3-7. Therefore common features, functions, and elements may not be redundantly described here.

The composite integrated root end cuff 802 may be coupled to the hub section 416 (FIG. 4) by pitch bearings 806. The pitch bearings 806 allow the composite integrated root end cuff 802 and thus the helicopter composite rotor blade 808 (402 in FIG. 4) to change pitch. During maintenance parts of the pitch bearings 806 may be separately replaced.

The composite bushing section 804 is located at a thickened composite section 810 and comprises cold worked bushings 812, and an inner metal bushing retainer 814. Various geometries or configurations of the composite bushing section 804 may be used as explained in more detail below.

FIG. 9 is an illustration of a cross sectional view of an exemplary rotor blade-to-hub coupling structure 900 taken along a line B-B 816 of the composite bushing section 804 of the exemplary rotor blade-to-hub coupling structure 800 according to an embodiment of the disclosure. The exemplary rotor blade-to-hub coupling structure 900 comprises a composite integrated root end cuff 902, a cold worked bushing 904, and an inner metal bushing retainer 906.

The composite integrated root end cuff 902 and the inner metal bushing retainer 906 comprise a square box shaped cross section. A width 908 of the composite integrated root end cuff 902 substantially perpendicular to the fastener assembly hole 306 may be, for example but without limitation, about 2.5 to about 4.5 inches, and the like. A width 910 of the composite integrated root end cuff 902 substantially parallel to the fastener assembly hole 306 may be, for example but without limitation, about 2.5 inches to about 4.5 inches, and the like. A material thickness 912 of the composite integrated root end cuff 902 may be, for example but without limitation, about 0.2 inches to about 0.8 inches, and the like.

FIG. 10 is an illustration of a cross sectional view of an exemplary rotor blade-to-hub coupling structure 1000 taken along the line B-B 816 of the composite bushing section 804 of the exemplary rotor blade-to-hub coupling 800 showing an exemplary separate external metal bushing retainer 1008 and an alternate geometry according to an embodiment of the disclosure. The exemplary rotor blade-to-hub coupling structure 1000 comprises a composite integrated root end cuff 1002, a cold worked bushing 1004, an inner metal bushing retainer 1006, and the external metal bushing retainer 1008.

The exemplary rotor blade-to-hub coupling structure 1000 comprises both the inner metal bushing retainer 1006 and the external metal bushing retainer 1008. The external metal bushing retainer 1008 is coupled to the cold worked bushing 1004 and may be attached thereto.

The cold worked bushing 1004 may be, for example but without limitation, circular, an annulus, tubular, and the like. The inner metal bushing retainer 1006 and the external metal bushing retainer 1008 reduce bearing stresses in the composite integrated root end cuff 1002 by redistributing the bearing stresses in the fastener assembly 506. The bearing stresses are redistributed from blade loads into the adjacent composite faces by the inner metal bushing retainer 1006 and the external metal bushing retainer 1008. The redistribution of bearing stresses increases a load carrying capability and life of the composite integrated root end cuff 1002. A material thickness 1010 of the composite integrated root end cuff 1002 may be, for example but without limitation, about 0.16 inches to about 3 inches, and the like. A diameter 1012 of the composite integrated root end cuff 1002 may be, for example and without limitation, about 2 inches to about 8 inches.

Figure 11:
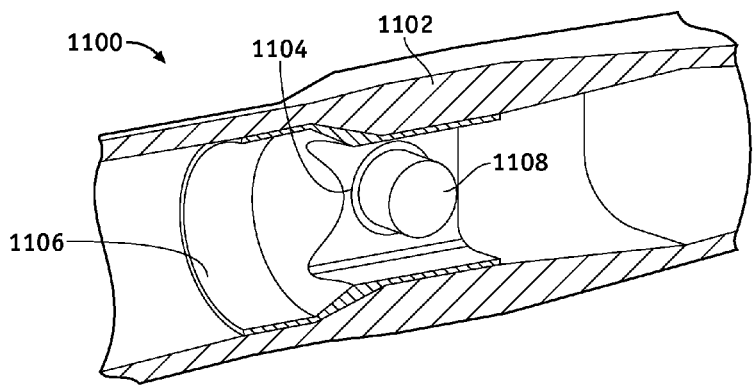
FIG. 11 is an illustration of a cross sectional view of an exemplary rotor blade-to-hub coupling structure showing a fastener positioned in a metal inner bushing retainer according to an embodiment of the disclosure.

FIG. 11 is an illustration of a cross sectional view of an exemplary rotor blade-to-hub coupling structure 1100 showing a fastener assembly 1108 positioned in an inner metal bushing retainer 1106 according to an embodiment of the disclosure. The exemplary rotor blade-to-hub coupling structure 1100 comprises an composite integrated root end cuff 1102, a cold worked bushing 1104, the inner metal bushing retainer 1106, and the fastener assembly 1108 is in the inner metal bushing retainer 1106 with the cold worked bushing 1104 therebetween.

Figure 12:
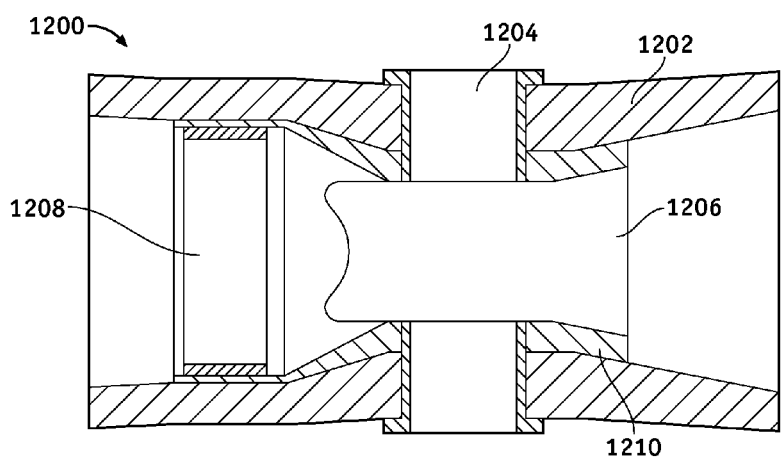
FIG. 12 is an illustration of a cross sectional view of an exemplary rotor blade-to-hub coupling structure showing combined pitch bearing and inner metal bushing retainer according to an embodiment of the disclosure.

FIG. 12 is an illustration of a cross sectional view of an exemplary rotor blade-to-hub coupling structure 1200 showing a combined pitch bearing 1208 and an inner metal bushing retainer 1206 according to an embodiment of the disclosure. The exemplary rotor blade-to-hub coupling structure 1200 comprises a composite integrated root end cuff 1202, a cold worked bushing 1204, and the inner metal bushing retainer 1206. The inner metal bushing retainer 1206 comprises the pitch bearing 1208. Combining the inner metal bushing retainer 1206 and the pitch bearing 1208 may lower a cost by combining two devices into one. In one embodiment, a tapered outer section 1210 feature can be incorporate into the inner metal bushing retainer 1206 to provide further reduction in the composite section bearing stress in the composite integrated root end cuff 1202. The tapered outer section 1210 provides a means for load sharing between the inner metal bushing retainer 1206 (610 in FIG. 6) and the composite integrated root end cuff 1202 (602 in FIG. 6), thereby reducing the bearing stresses at the edges 620/622/624/626. As shown in FIG. 12, the inner metal bushing retainer 1206 extends to the tapered outer section 1210 and supports the pitch bearing 1208.

Figure 13:
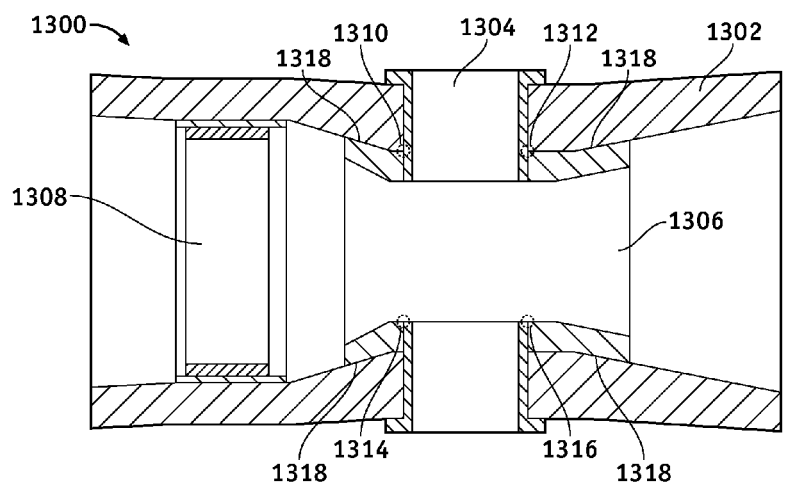
FIG. 13 is an illustration of a cross sectional view of an exemplary rotor blade-to-hub coupling structure showing a pitch bearing separated from an inner metal bushing retainer according to an embodiment of the disclosure.

FIG. 13 is an illustration of a cross sectional view of an exemplary rotor blade-to-hub coupling structure 1300 showing a pitch bearing 1308 separated from an inner metal bushing retainer 1306 according to an embodiment of the disclosure. The exemplary rotor blade-to-hub coupling structure 1300 comprises a composite integrated root end cuff 1302, a cold worked bushing 1304, the inner metal bushing retainer 1306, and the pitch bearing 1308. In comparison to the exemplary rotor blade-to-hub coupling structure 1200, the exemplary rotor blade-to-hub coupling structure 1300 comprises the inner metal bushing retainer 1306 separated from the pitch bearing 1308. The inner metal bushing retainer 1306 may be cold worked with the composite integrated root end cuff 1302. The rotor blade-to-hub coupling structure 1300 allows redistribution of a stress or stresses caused by the fastener assembly 606 across interface surfaces 1318 of the composite integrated root end cuff 1302 and the composite integrated root end cuff 1302 rather than the edges 1310/1312/1314/1316.

Figure 14:
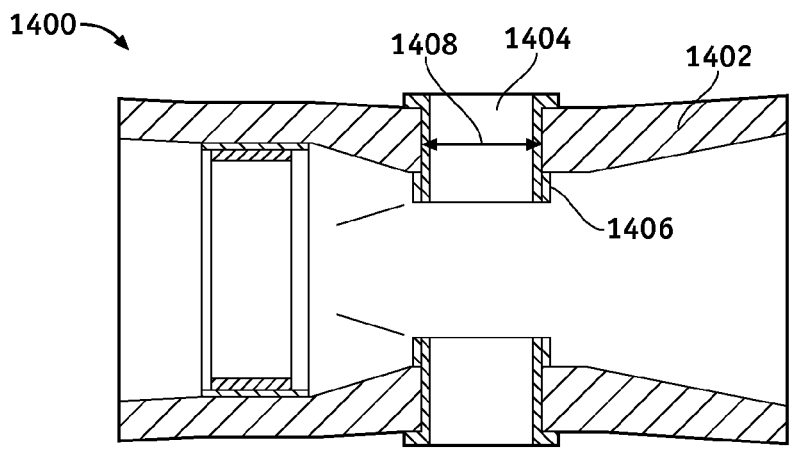
FIG. 14 is an illustration of a cross sectional view of an exemplary rotor blade-to-hub coupling structure showing simplified inner metal bushing retainers according to an embodiment of the disclosure.

FIG. 14 is an illustration of a cross sectional view of an exemplary rotor blade-to-hub coupling structure 1400 showing a simplified inner metal bushing retainer 1406 according to an embodiment of the disclosure. The exemplary rotor blade-to-hub coupling structure 1400 comprises a composite integrated root end cuff 1402, a cold worked bushing 1404, the inner metal bushing retainer 1406, and a fastener assembly hole 1408. The inner metal bushing retainer 1406 comprises a simple local retainer. The inner metal bushing retainer 1406 may be installed during installation of the cold worked bushing 1404. The inner metal bushing retainer 1406 may be slid over the cold worked bushing 1404 and secured in place by expanding the cold worked bushing 1404. The cold worked bushing 1404 is positioned in the fastener assembly hole 1408 and through the inner metal bushing retainer 1406. The cold worked bushing 1404 may be coupled or attached to the inner metal bushing retainer 1406 to reinforce the fastener assembly hole 1408.

Figure 15:
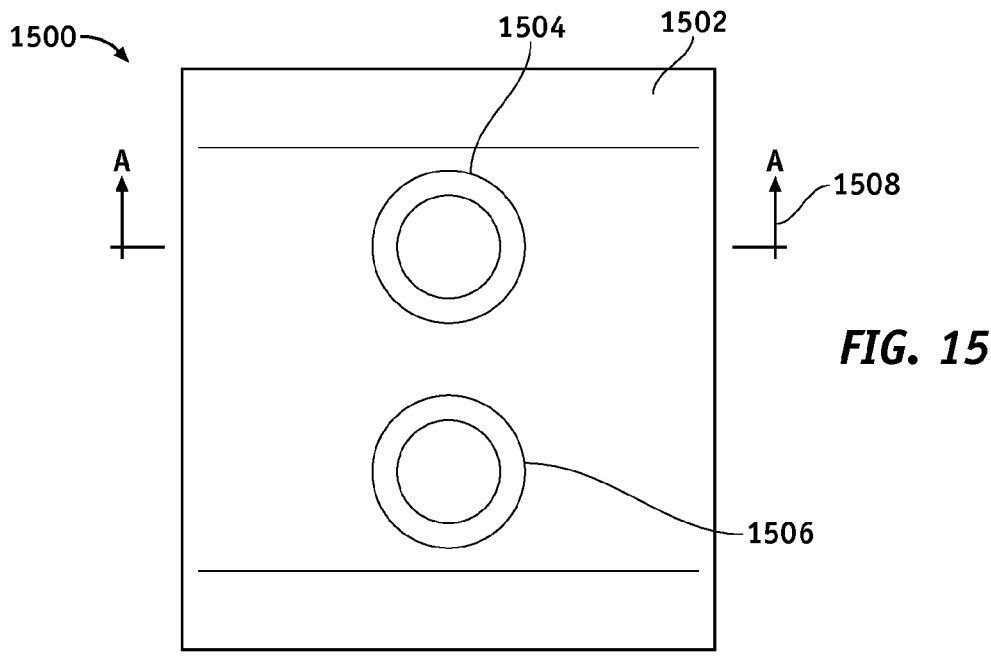
FIG. 15 is an illustration of an exemplary rotor blade-to-hub coupling structure showing two parallel cold worked bushings according to an embodiment of the disclosure.

FIG. 15 is an illustration of an exemplary rotor blade-to-hub coupling structure 1500 showing two parallel cold worked bushings according to an embodiment of the disclosure. The exemplary rotor blade-to-hub coupling structure 1500 comprises a composite integrated root end cuff 1502, a first fastener assembly hole 1504, and a second fastener assembly hole 1506. The exemplary rotor blade-to-hub coupling structure 1500 may comprise various numbers of holes, for example but without limitation, two, and the like. The first fastener assembly hole 1504 and the second fastener assembly hole 1506 are operable to provide a distributed loading through two fastener assemblies (not shown).

Figure 16:
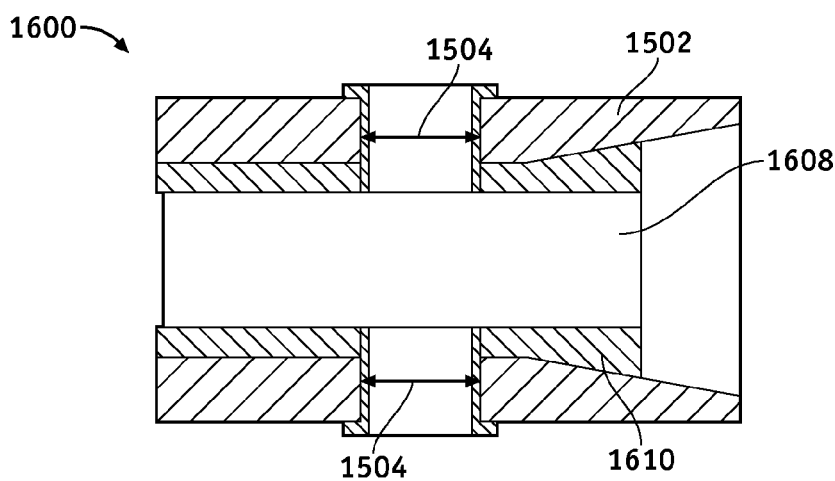
FIG. 16 is an illustration of a cross sectional view taken along line A-A of the exemplary rotor blade-to-hub coupling structure of FIG. 15.

FIG. 16 is an illustration of a cross sectional view of an exemplary rotor blade-to-hub coupling structure 1600 taken along a line A-A 1508 of the exemplary rotor blade-to-hub coupling structure 1500. The exemplary rotor blade-to-hub coupling structure 1600 comprises the composite integrated root end cuff 1502, the first fastener assembly hole 1504, and an inner metal bushing retainer 1608. The first fastener assembly hole 1504 and the second fastener assembly hole 1506 are coupled or attached in common to the inner metal bushing retainer 1608. The inner metal bushing retainer 1608 may comprise a tapered outer section 1610 widened to accommodate two or more fastener assemblies. In this case, two parallel fastener assemblies (not shown) may be fitted into the first fastener assembly hole 1504 and the second fastener assembly hole 1506 to absorb blade loads on the composite blade 300/402, such as but without limitation, centrifugal force, flap and chord bending and torsion moments.

Figure 17:
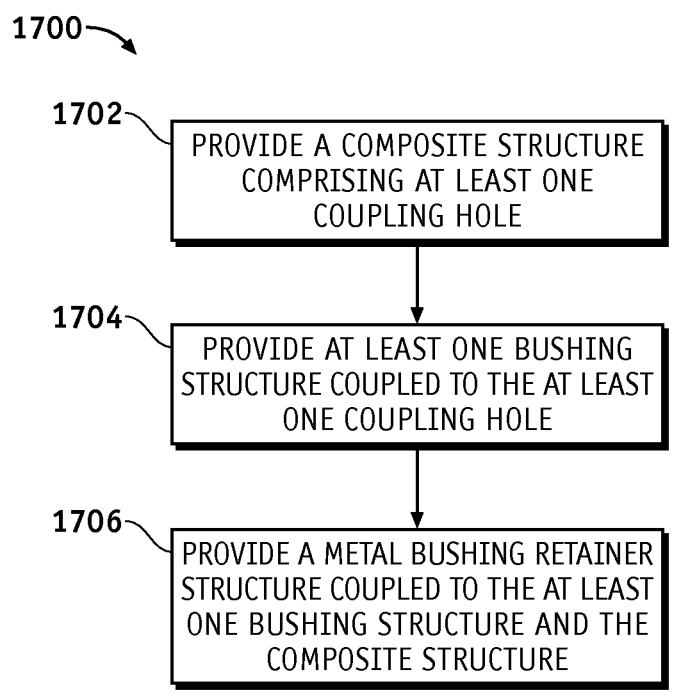
FIG. 17 is an illustration of a flow chart for an exemplary process for reducing bearing stress in a composite structure according to an embodiment of the disclosure.

FIG. 17 is an illustration of a flow chart for an exemplary process for reducing bearing stress in a composite structure according to an embodiment of the disclosure. The various tasks performed in connection with process 1700 may be performed by software, hardware, firmware, or any combination thereof. For illustrative purposes, the following description of process 1700 may refer to elements mentioned above in connection with FIGS. 1-16 and. In practical embodiments, portions of process 1700 may be performed by different elements of exemplary rotor blade-to-hub coupling structures 300-1600 such as the composite integrated root end cuff 502, the strap pack 504, the fastener assembly 506, the cold worked bushing 508, the inner metal bushing retainer 510, and the like. Process 1700 may have functions, material, and structures that are similar to the embodiments shown in FIGS. 1-16. Therefore common features, functions, and elements may not be redundantly described here.

Process 1700 may begin by providing a composite structure, such as but without limitation, the composite blade 300 comprising a coupling hole such as the fastener assembly hole 306/512 (task 1702). The fastener assembly hole 306/512 may be drilled through the composite blade 300 during or after making the composite blade 300. The composite integrated end root cuff 304 of the composite blade 300 may have a thickness larger in comparison to a composite airfoil 302 of the composite blade 300. In addition, the thickened section 312 in the composite blade spar 310 may have a thickness larger in comparison to the composite airfoil 302 of the composite blade 300.

Process 1700 may continue by providing a bushing structure such as the cold work bushing 508 coupled to the fastener assembly hole 306/512 (task 1704). Expanding the cold work bushing 508 may function to compression form the cold work bushing 508 into a strong fit with the fastener assembly hole 306/512.

Process 1700 may continue by providing a metal bushing retainer structure such as the inner metal bushing retainer 510 coupled or attached to the bushing structure such as the cold work bushing 508 and the fastener assembly hole 306/512 (task 1706). The metal bushing retainer structure may be coupled or attached to a composite structure such as the composite blade 300, as explained in the context of discussion of FIG. 5 above. In particular, the metal bushing retainer structure may be coupled or attached to the thickened section 312.

In this way, various embodiments of the disclosure provide for coupling of composite materials to other objects via a coupling hole while reducing bearing stresses in the composite materials around the coupling hole. In addition, various embodiments of the disclosure provide for substantially unitary composite parts to be used in more applications. Relative to metal-composite hybrids, unitary composite parts utilizing various embodiments of the disclosure provide an optimized stiffness, higher fatigue life, lower material weight and manufacturing cost, allows simple field inspection methods (visual) and a benign (slow propagating) readily inspectable failure mode. Furthermore, various embodiments minimize a need for detailed composite prepreg kitting, human assembly, and minimizes manufacturing process steps. Thereby, automated robust process methods may be used that to reduce cost and produce a high production yield.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-16 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An aircraft system comprising:
 a rotor hub comprising a blade connector;
 a composite blade comprising a hub connector comprising:
  a composite integrated root end cuff comprising a fastener assembly hole;
  a bushing coupled to the fastener assembly hole; and
  an inner metal bushing retainer coupled to the bushing and the fastener assembly hole, the bushing mechanically fused to the inner metal bushing retainer; and
 a fastener assembly coupled to the blade connector and the hub connector through the fastener assembly hole.

2. The aircraft system according to claim 1, wherein the bushing is mechanically fused to the inner metal bushing retainer by cold work expansion of the bushing.

3. The aircraft system according to claim 1, further comprising an external metal bushing retainer coupled to the bushing.

4. The aircraft system according to claim 3, wherein the external metal retainer is attached to the bushing.

5. The aircraft system according to claim 1, wherein the inner metal bushing retainer is coupled to a pitch bearing.

6. The aircraft system according to claim 1, wherein the inner metal bushing retainer comprises a tapered section operable to provide load sharing between the inner metal bushing retainer and the composite integrated root end cuff.

7. The aircraft system according to claim 1, wherein the composite blade further comprises a composite root end.

8. The aircraft system according to claim 7, wherein the inner metal bushing retainer is mechanically fused to the composite root end.

9. The aircraft system according to claim 7, wherein the composite root end is thickened near the fastener assembly hole.

10. The aircraft system according to claim 7, wherein the composite root end is integral with a blade spar.

11. The aircraft system according to claim 1, wherein:
the composite blade comprises at least two fastener assembly holes; and
at least one inner metal bushing retainer is coupled to the at least two fastener assembly holes.

12. The aircraft system according to claim 1, wherein the fastener assembly comprises one of the group consisting of: a preload clamping bushing, a pin-type joint, a bushing, a lug bolt, a lug bolt assembly, an axle, and a cotter pin.

13. An apparatus for reinforcing a joint in a composite material, the apparatus comprising:
a composite structure comprising a composite integrated root end cuff comprising a fastener assembly hole;
a bushing structure coupled to the composite structure; and
a first metal bushing retainer structure coupled to the bushing structure, and the composite structure, the bushing structure mechanically fused to the first metal bushing retainer structure.

14. The apparatus according to claim 13, wherein the first metal bushing retainer structure is attached to the composite structure.

15. The apparatus according to claim 13, wherein the bushing structure comprises a tapered section operable to provide load sharing between the first metal bushing retainer structure and the composite structure.

16. The apparatus according to claim 13, further comprising a second metal bushing retainer structure coupled to the bushing structure.

17. The apparatus according to claim 16, wherein the second metal bushing retainer structure is attached to the bushing structure.

18. A method for reducing bearing stress in a composite structure, the method comprising:
providing a composite structure comprising at least one coupling hole;
providing at least one bushing structure coupled to the at least one coupling hole; and
providing a metal bushing retainer structure coupled to the at least one bushing structure and the composite structure, the at least one bushing structure coupled to the metal bushing retainer structure by expanding the at least one bushing structure.

19. The method according to claim 18, further comprising: providing coupling means coupled to the at least one bushing structure and the metal bushing retainer structure.

20. The method according to claim 18, further comprising: providing a rotor hub comprising a connector coupled to the composite structure through the at least one coupling hole via coupling means.

* * * * *